(12) United States Patent
Shimada et al.

(10) Patent No.: US 9,562,774 B2
(45) Date of Patent: Feb. 7, 2017

(54) GUIDANCE DEVICE, GUIDANCE METHOD, AND NON-TRANSITORY COMPUTER READABLE MEDIUM

(71) Applicant: FUJI XEROX CO., LTD., Tokyo (JP)

(72) Inventors: Yuhei Shimada, Yokohama (JP); Manabu Ueda, Yokohama (JP); Yuichi Ueno, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/662,984

(22) Filed: Mar. 19, 2015

(65) Prior Publication Data
US 2015/0192418 A1 Jul. 9, 2015

Related U.S. Application Data

(63) Continuation of application No. PCT/JP2013/065426, filed on Jun. 4, 2013.

(30) Foreign Application Priority Data

Oct. 18, 2012 (JP) ................................. 2012-230964

(51) Int. Cl.
*G01C 21/00* (2006.01)
*G01C 21/20* (2006.01)
*G01C 21/36* (2006.01)
*G06F 17/30* (2006.01)

(52) U.S. Cl.
CPC ........... *G01C 21/20* (2013.01); *G01C 21/3655* (2013.01); *G06F 17/30041* (2013.01)

(58) Field of Classification Search
CPC combination set(s) only.
See application file for complete search history.

(56) References Cited

U.S. PATENT DOCUMENTS

| 2001/0020211 A1 | 9/2001 | Takayama et al. |
| 2002/0089450 A1* | 7/2002 | Dowdle .................... G01S 5/02 342/453 |

(Continued)

FOREIGN PATENT DOCUMENTS

| JP | 07-301538 A | 11/1995 |
| JP | 2001-311626 A | 11/2001 |

(Continued)

OTHER PUBLICATIONS

Translation of Written Opinion (PCT/ISA/237) issued Sep. 3, 2013, in related International Patent Application No. PCT/JP2013/065426.

(Continued)

*Primary Examiner* — Yonel Beaulieu
(74) *Attorney, Agent, or Firm* — Sughrue Mion, PLLC (57) ABSTRACT

A guidance device includes: a storing unit that stores information regarding content, a reproduction time of the content, and a providing range different from each content; a calculation unit that acquires a current position of a user and calculates a movement status; a selection unit that estimates, based on the movement status of the user calculated by the calculation unit, a position of the user at a time when the reproduction time of the content has passed, and selects from the storing unit content whose content providing range includes the estimated position.

10 Claims, 12 Drawing Sheets

(56) References Cited

U.S. PATENT DOCUMENTS

| | | | | |
|---|---|---|---|---|
| 2002/0158796 | A1* | 10/2002 | Humphrey | G01C 21/165 |
| | | | | 342/357.31 |
| 2006/0184324 | A1* | 8/2006 | Kim | G01S 19/22 |
| | | | | 701/412 |
| 2012/0081574 | A1* | 4/2012 | Kawakami | H04N 9/8205 |
| | | | | 348/231.3 |
| 2013/0322698 | A1* | 12/2013 | Moden | G06T 7/0048 |
| | | | | 382/107 |

FOREIGN PATENT DOCUMENTS

| | | |
|---|---|---|
| JP | 2006-012081 A | 1/2006 |
| JP | 2008-039623 A | 2/2008 |
| JP | 2009-085697 A | 4/2009 |
| JP | 2009-092607 A | 4/2009 |
| JP | 2011-237175 A | 11/2011 |
| JP | 2012-018175 A | 1/2012 |

OTHER PUBLICATIONS

ISR (PCT/ISA/210) issued Sep. 3, 2013, in related International Patent Application No. PCT/JP2013/065426.
Written Opinion (PCT/ISA/237) issued Sep. 3, 2013, in related International Patent Application No. PCT/JP2013/065426.
Patent Examination Report issued Feb. 29, 2016, by IP Australia in counterpart Australian Application No. 2013333248.

* cited by examiner

| GUIDANCE TARGET ID | CONTENT ID | GUIDANCE TARGET LOCATION | CONTENT PROVIDING RANGE | REPRODUCTION TIME | SIGHTSEEING PURPOSE | MOVING SPEED | SOUND CONTENT ID |
|---|---|---|---|---|---|---|---|
| 0220 | 01003 | N. Lat. 35.32 E. Long. 139.55 | 10 m | 30 SECONDS | NATURE | LESS THAN OR EQUAL TO 5 km/h | 03021 |
| 0220 | 01004 | N. Lat. 35.32 E. Long. 139.55 | 100 m | 20 SECONDS | HISTORY | EQUAL TO OR MORE THAN 5 km/h AND LESS THAN OR EQUAL TO 15 km/h | 03022 |
| 0224 | 01005 | N. Lat. 35.44 E. Long. 139.72 | 100 m | 10 SECONDS | SHOPPING | EQUAL TO OR MORE THAN 40 km/h | 06042 |

112 CONTENT INFORMATION

FIG. 4

113 USER ATTRIBUTE INFORMATION

| USER ID | SEX | AGE GROUP |
|---------|------|-----------|
| 001 | MALE | 40'S |

FIG. 5

114 SIGHTSEEING REQUIREMENT INFORMATION

| DEPARTURE TIME | DEPARTURE LOCATION | END TIME | END LOCATION | REQUIRED TIME | PURPOSE OF TRIP |
|---|---|---|---|---|---|
| 03/15/2012 10:00:00 | KAMAKURA STATION | NULL | KAMAKURA STATION | NULL | HISTORY |

GUIDANCE DEVICE, GUIDANCE METHOD, AND NON-TRANSITORY COMPUTER READABLE MEDIUM

CROSS REFERENCE TO RELATED APPLICATION

This is a continuation of International Application No. PCT/JP2013/065426 filed on Jun. 4, 2013, and claims priority from Japanese Patent Application No. 2012-230964, filed on Oct. 18, 2012.

BACKGROUND

1. Technical Field

The present invention relates to a guidance device, a guidance method, and a non-transitory computer readable medium.

2. Related Art

As a related art, a guidance device which changes a timing for starting guidance in accordance with the moving speed of an automobile or the like has been suggested.

SUMMARY

An aspect of the present invention provides a guidance device including: a storing unit that stores information regarding content, a reproduction time of the content, and a providing range of the content; a calculation unit that acquires a current position of a user and calculates a movement status; a selection unit that estimates, based on the movement status of the user calculated by the calculation unit, a position of the user at a time when the reproduction time of the content has passed, and selects from the storing unit content whose content providing range includes the estimated position.

BRIEF DESCRIPTION OF THE DRAWINGS

Exemplary embodiment(s) of the present invention will be described in detail based on the following figures, wherein.

DETAILED DESCRIPTION

[First Exemplary Embodiment]

(Use Mode)

Figure 1:
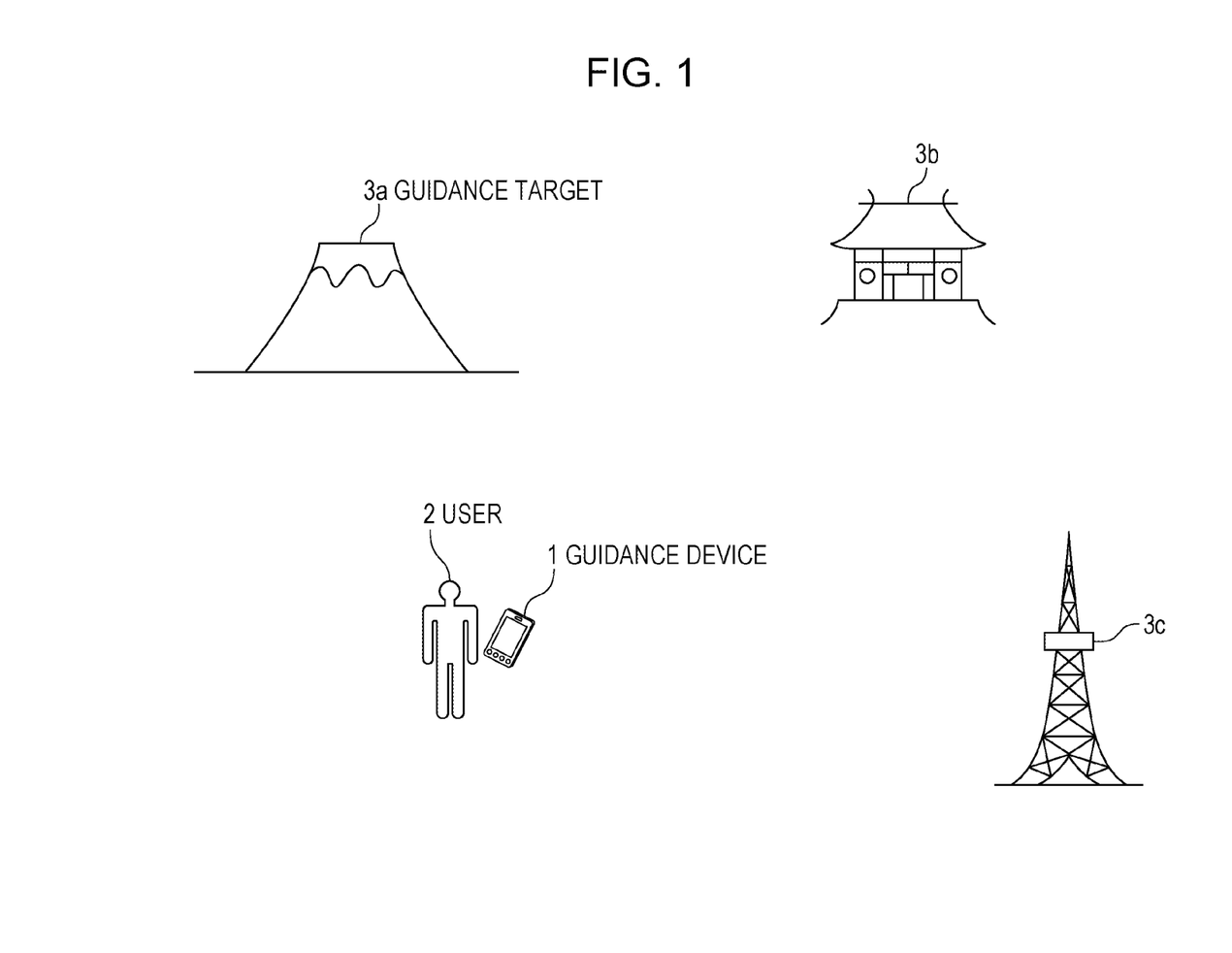
FIG. 1 is a schematic view for illustrating an example of a use mode of a guidance device.

FIG. 1 is a schematic view for illustrating an example of a use mode of a guidance device.

A guidance device 1 is carried by a user 2, and reproduces content for guidance on guidance targets 3a to 3c registered in advance. Guidance content is reproduced in the form of sound, video, still images, and the like, and output to a sound output unit and a display unit of the guidance device 1. The user 2 travels by transportation means, such as on foot, by bicycle, by automobile, by train, by ship, by aircraft, by rocket, or the like.

(Configuration of Guidance Device)

Figure 2:
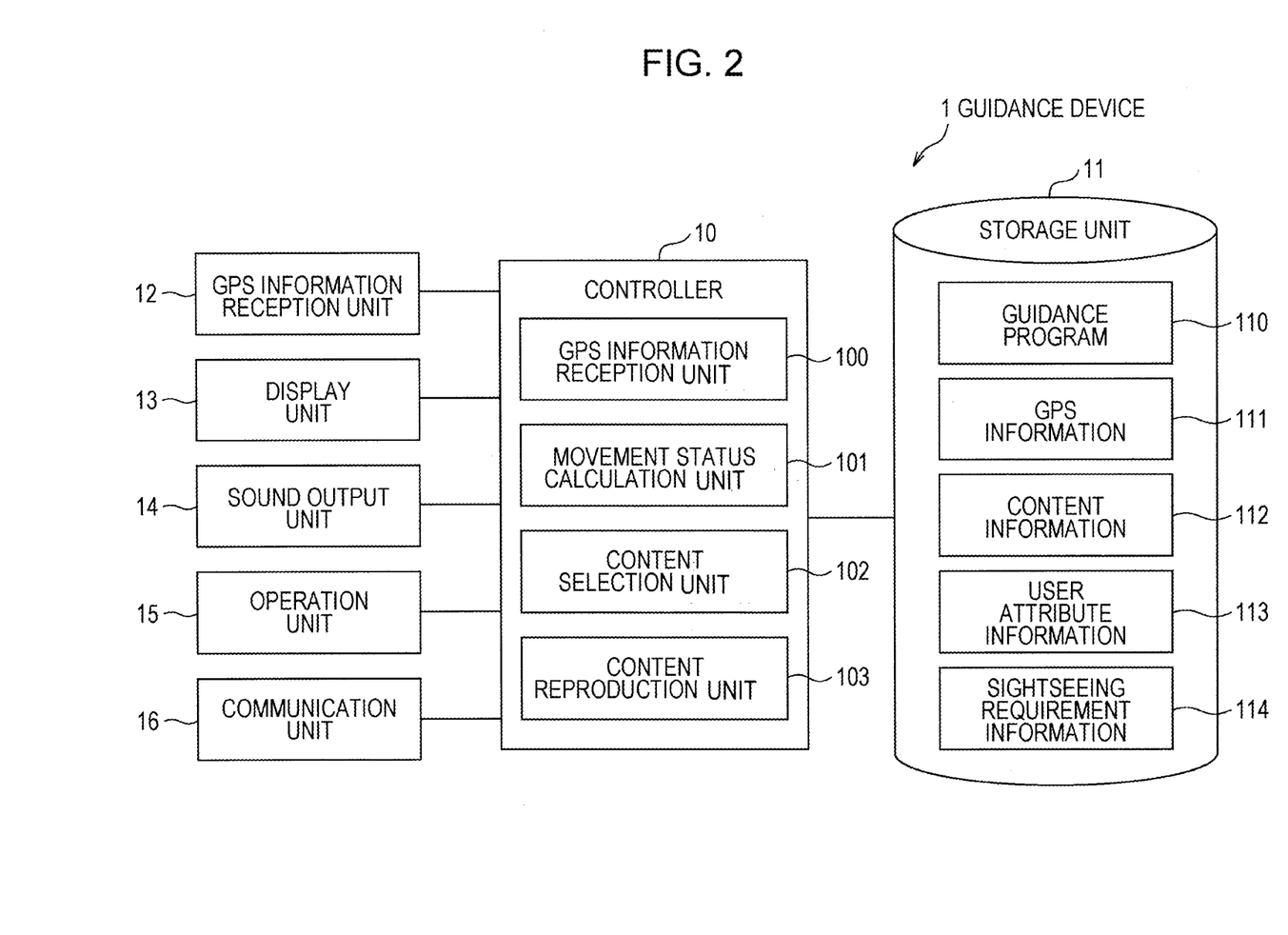
FIG. 2 is a block diagram for illustrating an example of the configuration of the guidance device.

FIG. 2 is a block diagram for illustrating an example of the configuration of the guidance device 1.

The guidance device 1 includes a controller 10 that includes a CPU (Central Processing Unit) and the like to control individual units and executes various programs, a storage unit 11 that includes a recording medium, such as an HDD (Hard Disk Drive) or a flash memory, and is an example of a storage device which stores information, a GPS information reception unit 12 that receives GPS (Global Positioning System) information as positional information of the guidance device 1, a display unit 13 such as an LCD (Liquid Crystal Display), a sound output unit 14 that includes a speaker, an amplifier, and the like to output sound, an operation unit 15 that includes a touch pad or plural operation keys, and a communication unit 16 that communicates with an external device or the like via a network.

The controller 10 functionally includes a GPS information reception unit 100, a movement status calculation unit 101, a content selection unit 102, a content reproduction unit 103, and the like when executing a guidance program 110 of the storage unit 11.

The GPS information reception unit 100 receives GPS information received by the GPS information reception unit 12, and stores the GPS information as GPS information 111 into the storage unit 11.

The movement status calculation unit 101 calculates the current position and the moving speed (speed and direction) of a user, based on the GPS information 111.

The content selection unit 102 mainly selects from content information 112 content to be reproduced, on the basis of the current position, the moving speed, and the like calculated by the movement status calculation unit 101. The content selection unit 102 also selects from the content information 112 content to be reproduced, on the basis of user attribute information 113 and sightseeing requirement information 114.

The content reproduction unit 103 reproduces content selected by the content selection unit 102, and outputs the content to the display unit 13 and the sound output unit 14.

The storage unit 11 stores the guidance program 110 for causing the controller 10 to function as the units 100 to 103 mentioned above, the GPS information 111 received by the GPS information reception unit 100, the content information 112, which is guidance content prepared for each guidance target, the user attribute information 113 indicating the attributes of the user 2 of the guidance device 1, the sightseeing requirement information 114 indicating a sightseeing requirement by the user 2 of the guidance device 1, and the like.

By providing the controller 10 (only the GPS information reception unit 100 and the content reproduction unit 103), the GPS information reception unit 12, the sound output unit 14, and the communication unit 16 in the guidance device carried by the user and providing the other configuration in an external server or the like, a cloud computing configuration may be provided in which such a server or the like is caused to function as the movement status calculation unit 101 and the content selection unit 102. Furthermore, the configuration provided in the guidance device and the configuration provided in the external server may be replaced with each other in an appropriate manner.

Figure 3:
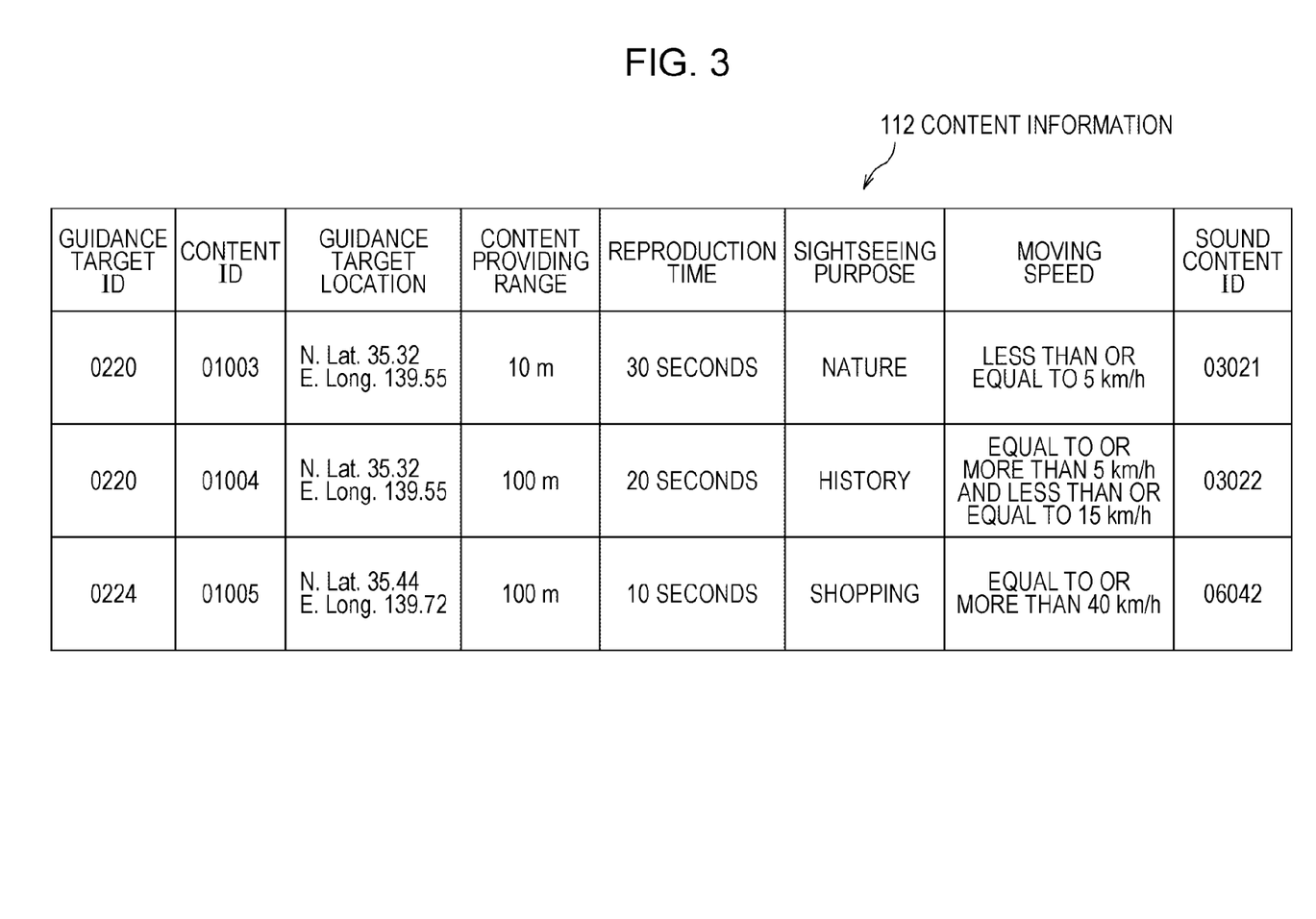
FIG. 3 is a schematic view for illustrating an example of the configuration of content information.

FIG. 3 is a schematic view for illustrating an example of the configuration of the content information 112.

The content information 112 includes a guidance target ID field indicating the identifier of a guidance target, a content ID field indicating the identifier of content, a guidance target location field indicating positional information of the location of a guidance target, a content providing range indicating a range centered on the location of a guidance target in which content is provided, a reproduction time field indicating the reproduction time of content, a sightseeing purpose field indicating a sightseeing purpose which is suitable for content, a moving speed field indicating the moving speed of a guidance device as a condition for reproducing content, and a sound content ID field indicating the identifier of sound content to be reproduced for a guidance target.

The content information 112 is, for example, registered in advance by an administrator of the guidance device 1.

Figure 4:
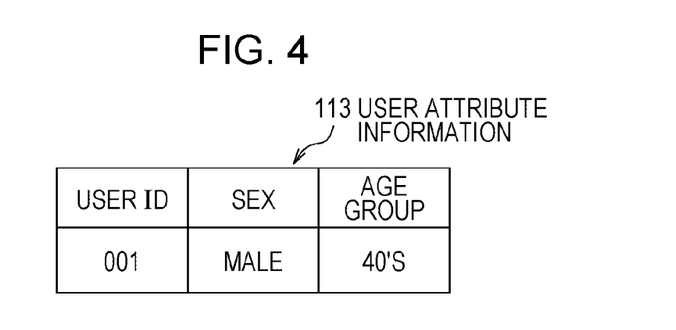
FIG. 4 is a schematic view for illustrating an example of the configuration of user attribute information.

FIG. 4 is a schematic view for illustrating an example of the configuration of the user attribute information 113.

The user attribute information 113 includes a user ID field indicating the identifier of a user, a sex field indicating the sex of a user, and an age group field indicating the age group of a user.

The user attribute information 113 is, for example, registered in advance by the user 2 or the administrator of the guidance device 1.

Figure 5:
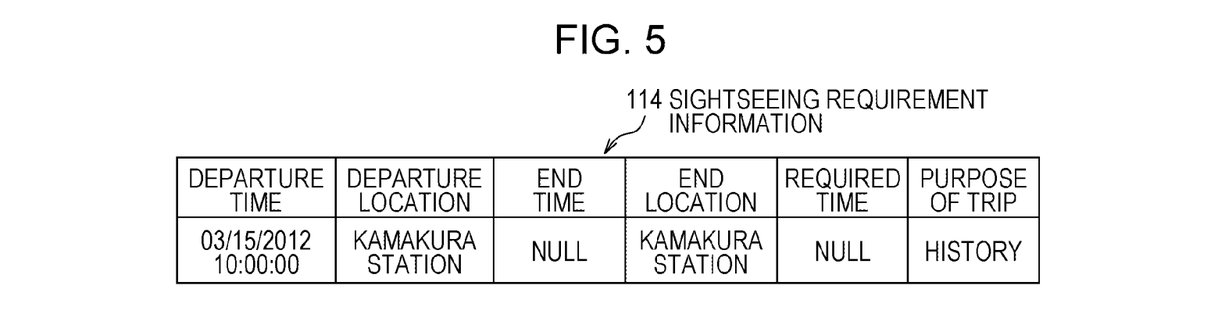
FIG. 5 is a schematic view for illustrating an example of the configuration of sightseeing requirement information.

FIG. 5 is a schematic view for illustrating an example of the configuration of the sightseeing requirement information 114.

The sightseeing requirement information 114 includes a departure time field indicating the departure time for sightseeing, a departure location field indicating the departure location for sightseeing, an end time field indicating the end time for sightseeing, an end location field indicating the end location for sightseeing, a required time field indicating the required time for sightseeing, and a trip purpose field indicating a purpose of a trip.

The sightseeing requirement information 114 is, for example, set in advance by the user 2.

(Operation of Guidance Device)

Next, operations of this exemplary embodiment will be explained in terms of (1) basic operation, (2) movement status calculation operation, (3) content selection operation, and (4) content reproduction operation.

First, the outline of an operation of the guidance device 1 will be explained.

(1) Basic Operation

Figure 6:
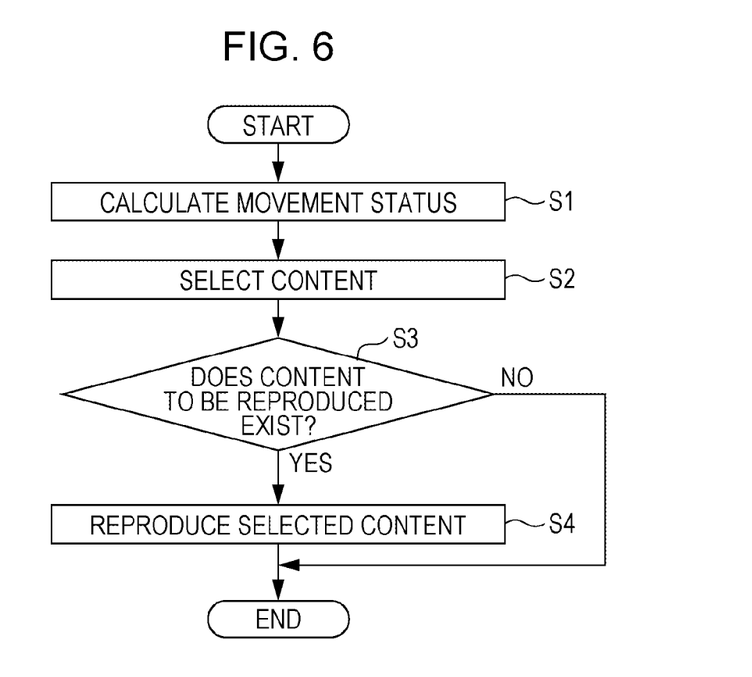
FIG. 6 is a flowchart for illustrating an example of a basic operation of the guidance device.

FIG. 6 is a flowchart for illustrating an example of a basic operation of the guidance device 1.

The movement status calculation unit 101 calculates the current position and the moving speed (speed and direction) of a user, based on the GPS information 111 (S1).

Next, the content selection unit 102 mainly selects from the content information 112 content to be reproduced, on the basis of the current position, the moving speed, and the like calculated by the movement status calculation unit 101 (S2).

When content to be reproduced is selected in step S2 (S3; Yes), the content reproduction unit 103 reproduces the content selected by the content selection unit 102, and outputs the content to the display unit 13 and the sound output unit 14 (S4).

Next, in "(2) movement status calculation operation" described below, step S1 of FIG. 6 will be explained in detail.

(2) Movement Status Calculation Operation

Figure 7:
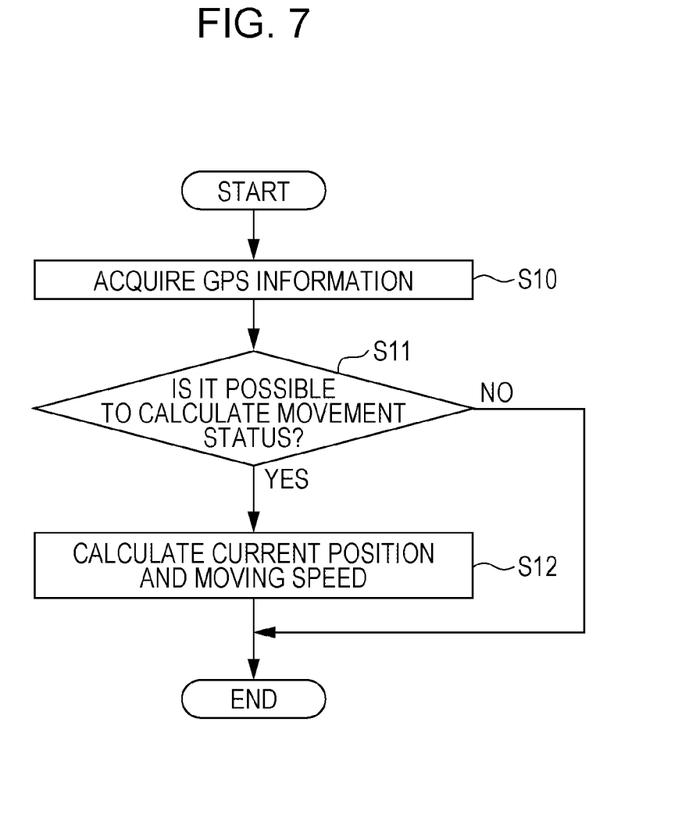
FIG. 7 is a flowchart for illustrating an example of a movement status calculation operation of the guidance device.

FIG. 7 is a flowchart for illustrating an example of a movement status calculation operation of the guidance device 1.

First, the GPS information reception unit 100 receives GPS information received by the GPS information reception unit 12, and stores the GPS information as the GPS information 111 into the storage unit 11 (S10).

Next, the movement status calculation unit 101 determines that it is possible to calculate the movement status when there are at least two pieces of positional information as the GPS information 111 (S11; Yes), and calculates the current position and the moving speed in accordance with a method described below (S12).

Figure 9:
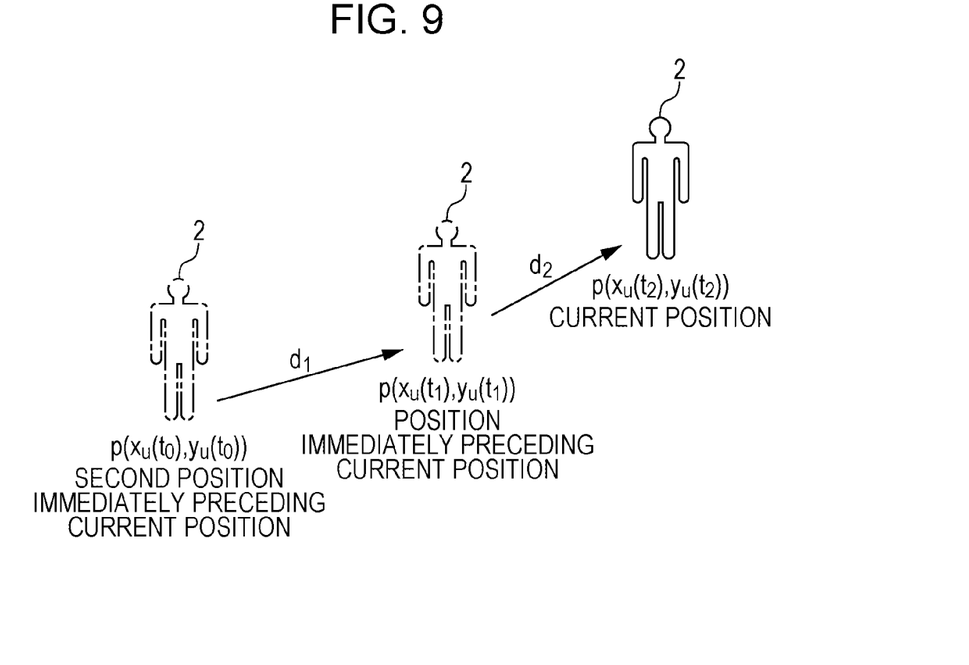
FIG. 9 is a schematic view for explaining a calculation operation for a movement status.

FIG. 9 is a schematic view for explaining a calculation operation for the movement status.

The movement status calculation unit 101 acquires from the GPS information 111 the current location $p(xu(t2),yu(t2))$ of the user 2 at the current time t2, the location $p(xu(t1),yu(t1))$ of the user 2 at a time t1, which is the time at which the GPS information reception unit 100 received GPS information and which is the time immediately preceding the current time t2, and the location $p(xu(t0),yu(t0))$ of the user 2 at a time t0, which is the time at which the GPS information reception unit 100 received GPS information and which is the second time immediately preceding the current time t2.

Next, a vector d2, which connects the current position with the position immediately preceding the current position, and a vector d1, which connects the position immediately preceding the current position with the second position immediately preceding the current position, are obtained, and a moving speed v is calculated from the average of d1 and d2. The current position is represented by $p(xu(t2),yu(t2))$. Furthermore, the moving speed v may be calculated only from d1, or the moving speed v may be calculated from the average of a larger number of pieces of positional information. The movement status calculation unit 101 may be configured to calculate a movement status including at least one of the "movement path", the "moving speed", and the "moving direction" of the user 2, on the basis of the time and positional information.

Next, in "(3) content selection operation" described below, step S2 of FIG. 6 will be explained in detail.

(3) Content Selection Operation

Figure 8:
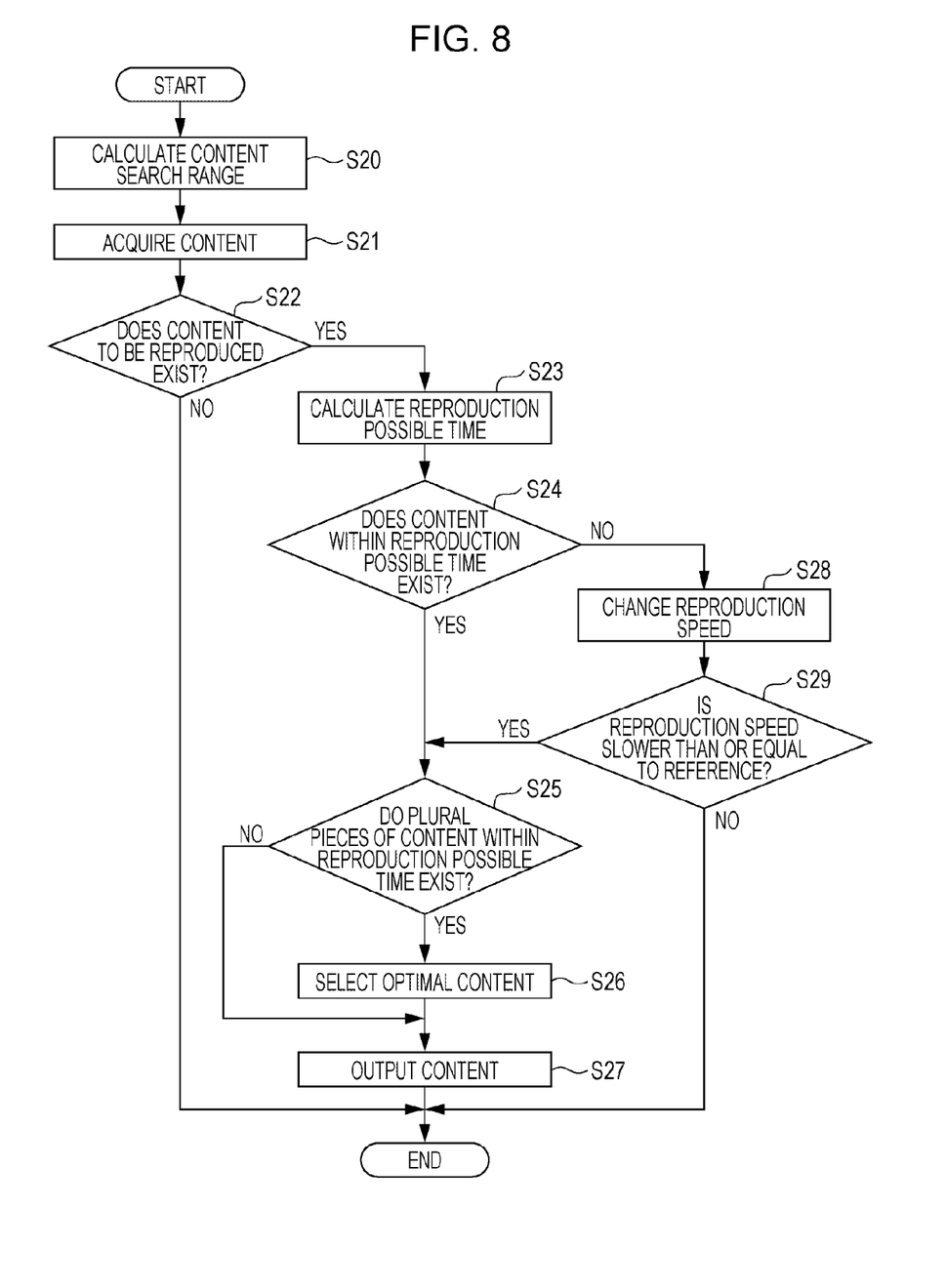
FIG. 8 is a flowchart for illustrating an example of a content selection operation of the guidance device.

FIG. 8 is a flowchart for illustrating an example of a content selection operation of the guidance device 1.

First, the content selection unit 102 calculates a content search range (S20). The content search range represents the range of a region around the user 2, where content is acquired from the content information 112.

Figure 10:
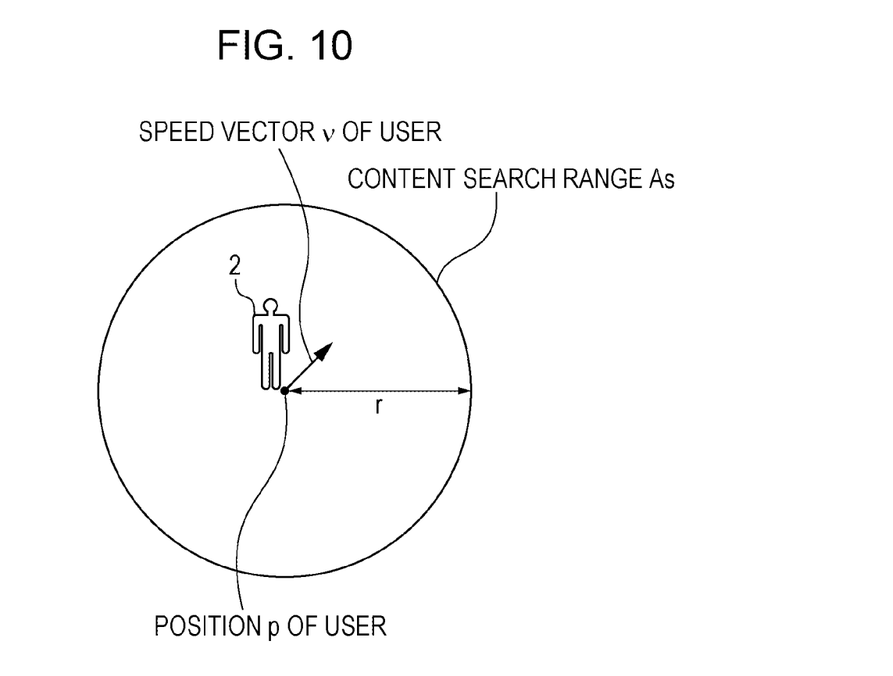
FIG. 10 is a schematic view for explaining a calculation operation for a content search range.

FIG. 10 is a schematic view for explaining a calculation operation for the content search range.

For example, a content search range As is represented by a region within a circle with the radius r centered on the current position p of a user. Here, r is equal to f(|v|), and f(x) represents a monotonically increasing function defined by x≥0. That is, this function indicates that the content search range As increases as the moving speed of the user 2 increases. The outer shape of the content search range As is not necessarily a circle but may be a fan-like shape or a polygonal shape.

Next, the content selection unit 102 acquires from the content information 112 content whose value of the guidance target location field is included in the content search range As (S21).

When content is acquired in step S21 (S22; Yes), the operation proceeds to step S23. When no content is acquired (S22; No), the operation ends.

Next, the content selection unit 102 calculates a reproduction possible time. The reproduction possible time represents a time for which the user is estimated to stay within a content providing range, which is defined by the value of the guidance target location field and the value of the content providing range field of the content information 112.

Figure 11:
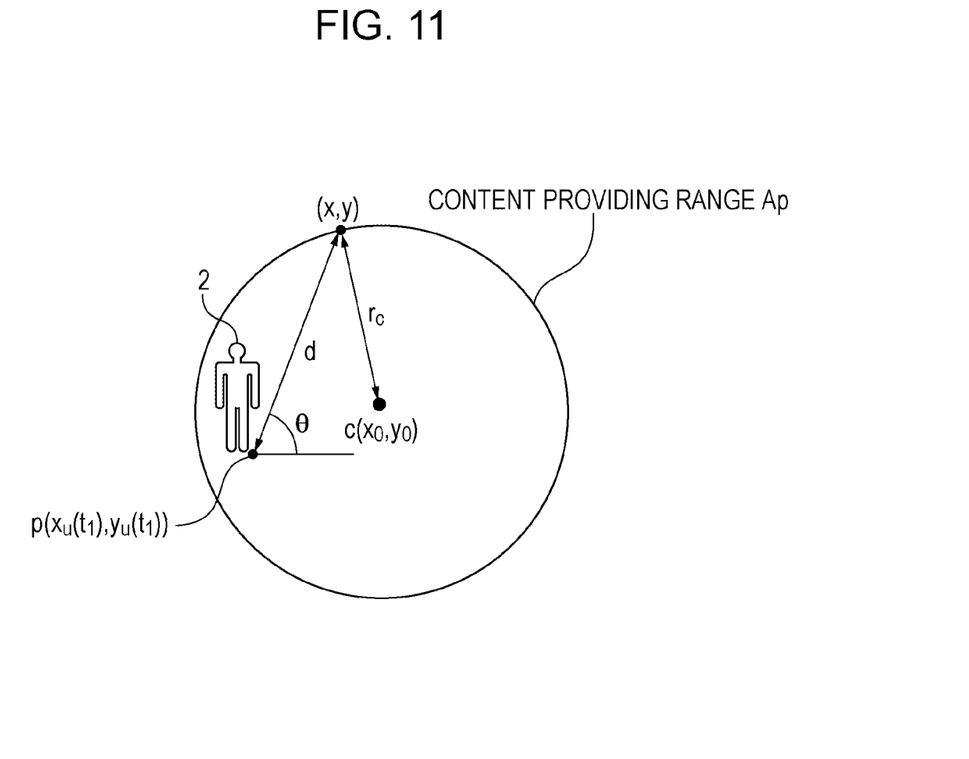
FIG. 11 is a schematic view for explaining a calculation operation for a reproduction possible time.

FIG. 11 is a schematic view for explaining a calculation operation for the reproduction possible time.

First, a content providing range Ap is a region within a circle with the radius rc centered on c (x0,y0), where the value of the guidance target location field is represented by c(x0,y0) and the value of the content providing range field is represented by rc.

When the current time is represented by t1, the current position of the user is represented by (xu(t1),yu(t1)), the moving direction is represented by θ, and the expected point at which the user 2 exits from the content providing range is represented by (x,y), the following relational expressions are satisfied:

[Math. 1]

$$(x-x_0)^2+(y-y_0)^2=r_c^2 \quad (1)$$

$$y-y_u(t_1)=\tan\theta\cdot(x-x_u(t_1)) \quad (2)$$

By solving expressions (1) and (2), the reproduction possible time tα is obtained as in expression (3).

[Math. 2]

$$t_\alpha = \frac{\sqrt{(x-x_u(t_1))^2 + (y-y_u(t_1))^2}}{v} \quad (3)$$

Although two solutions are obtained, one of them is specified based on the moving direction. If a guidance target is popular or the like and the moving speed of the user 2 is therefore expected to become slower, the reproduction possible time tα may be corrected to be longer.

Furthermore, by further preparing sightseeing history information including accumulated information regarding staying times during which other users were staying in the content providing range, the content selection unit 102 may calculate the reproduction possible time on the basis of the movement status (current position and moving speed) of the user and the sightseeing history information.

Next, the content selection unit 102 refers to the reproduction time field of the content information 112. When content whose reproduction time is shorter than the reproduction possible time tα exists (324; Yes), the operation proceeds to step S25. When such content does not exist (S24; No), the reproduction time is changed to fall within the reproduction possible time Tα (S28). When the changed reproduction speed is slower than or equal to a predetermined reference reproduction speed (S29; Yes), the operation proceeds to step S25. This is because since too fast reproduction speed makes it difficult for the user to hear content, content whose reproduction speed is slower than or equal to the predetermined reference speed is reproduced. Even if no content whose reproduction time is shorter than the reproduction possible time tα exists (S24; No), when content whose reproduction time is a predetermined time or less (for example, several seconds) longer than the reproduction possible time tα exists, the content may be selected without changing the reproduction speed.

Next, when plural pieces of content whose reproduction time is within the reproduction possible time tα exist (S25; Yes), an optimal piece of content is selected (S26). The optimal content is content whose reproduction speed is not changed and whose reproduction time is long.

4) Content Reproduction Operation

Next, the content reproduction unit 103 reproduces the content selected from the content information 112 by the content selection unit 102 (S27). In the case where the reproduction speed of the content has been changed, the content is reproduced at the changed reproduction speed.

(Advantages of First Exemplary Embodiment)

According to the exemplary embodiment described above, content with a content providing range and a reproduction time which match the movement status of the user 2 is selected and reproduced. Therefore, guidance on a guidance target can be provided in accordance with the movement status of the user 2, the characteristics of the guidance target, and the like. That is, for example, a content providing range of a guidance target which can be visually recognized by the user 2 who is in a distant location is increased, a content providing range of a guidance target which can be visually recognized only by the user 2 who is in a near location is decreased, content is selected in accordance with the moving speed of the user 2 who is passing through the content providing range, and the reproduction speed is changed.

The content information 112 may further include items provided in the user attribute information 113 and the sightseeing requirement information 114, and the content selection unit 102 may select content which matches the user attribute information 113 and the sightseeing requirement information 114 of the user 2 in accordance with conditions of the content information 112. This is applied when the optimal piece of content is selected in step S26 of FIG. 8.

[Second Exemplary Embodiment]

A second exemplary embodiment is different from the first exemplary embodiment in the details of "(3) content selection operation". Therefore, explanation for configurations and operations similar to the first exemplary embodiment will be omitted.

Figure 12:
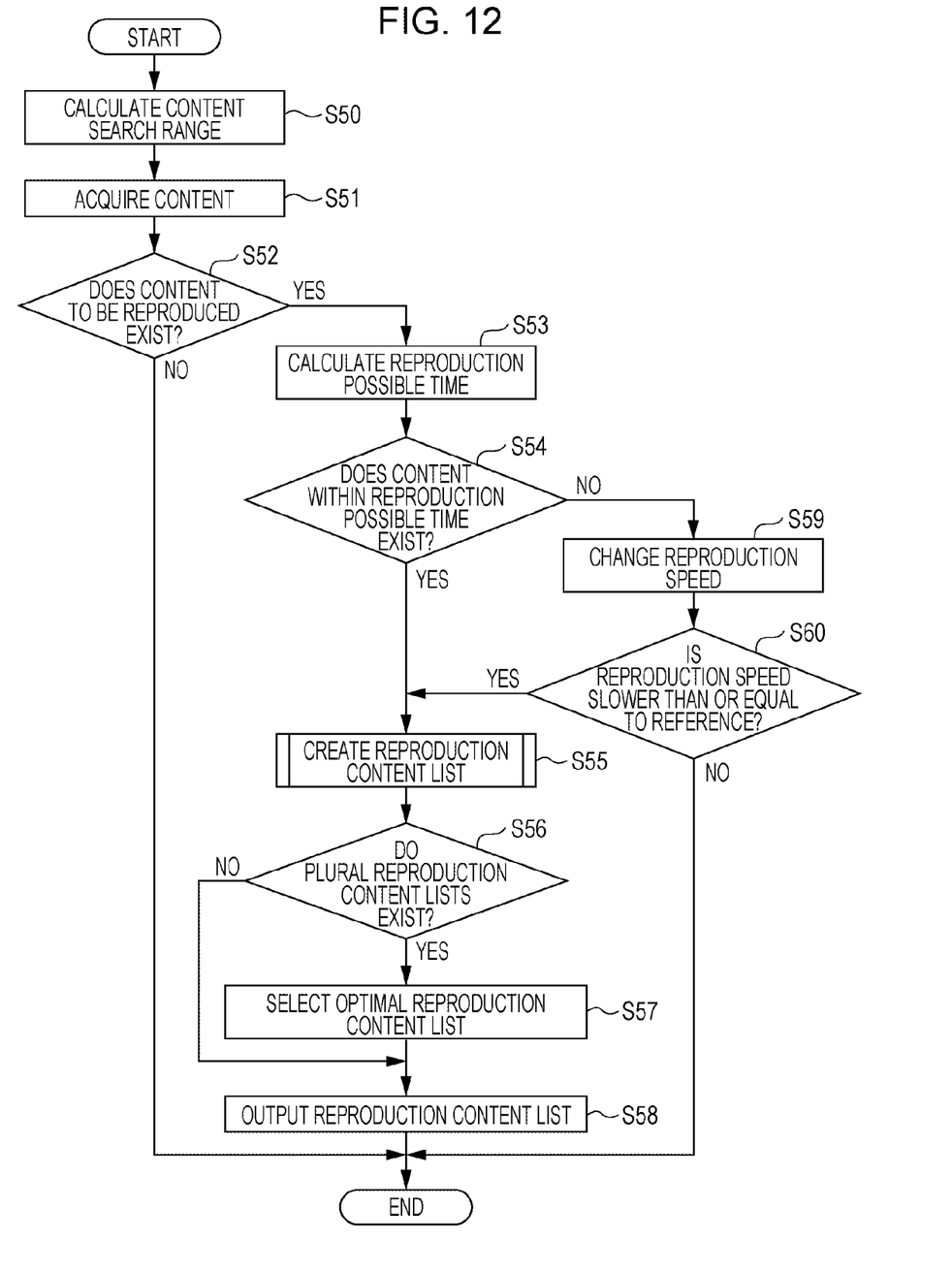
FIG. 12 is a flowchart for illustrating an example of a content selection operation of a guidance device according to a second exemplary embodiment.

FIG. 12 is a flowchart for illustrating an example of a content selection operation of a guidance device according to the second exemplary embodiment. Steps other than steps S55 to S58 are the same as those in the operation illustrated in FIG. 8.

In step S55, the content selection unit 102 creates a reproduction content list including a list of plural pieces of content arranged in a reproduction order (S55). Specifically, in the case where content whose reproduction time is within a reproduction possible time exists, content within the content search range which can be continuously reproduced is searched for, and the found content is added to the reproduction content list. A method for creating the reproduction content list will be explained in detail with reference to FIG. 13.

Next, when plural created reproduction content lists exist (S56; Yes), the content selection unit 102 selects an optimal reproduction content list from among the plural reproduction content lists (hereinafter, referred to as a "reproduction content list group") on the basis of predetermined conditions (S57). Here, as the predetermined conditions, a condition that priority is given to a reproduction content list in which as many pieces of content as possible can be reproduced, a condition that priority is given to a reproduction content list including content with a high priority, and the like can be set.

Next, the content reproduction unit 103 reproduces content in the reproduction content list selected from the content information 112 by the content selection unit 102 (S58). In the case where the reproduction speed of the content has been changed, the content is reproduced at the changed reproduction speed.

Figure 13:
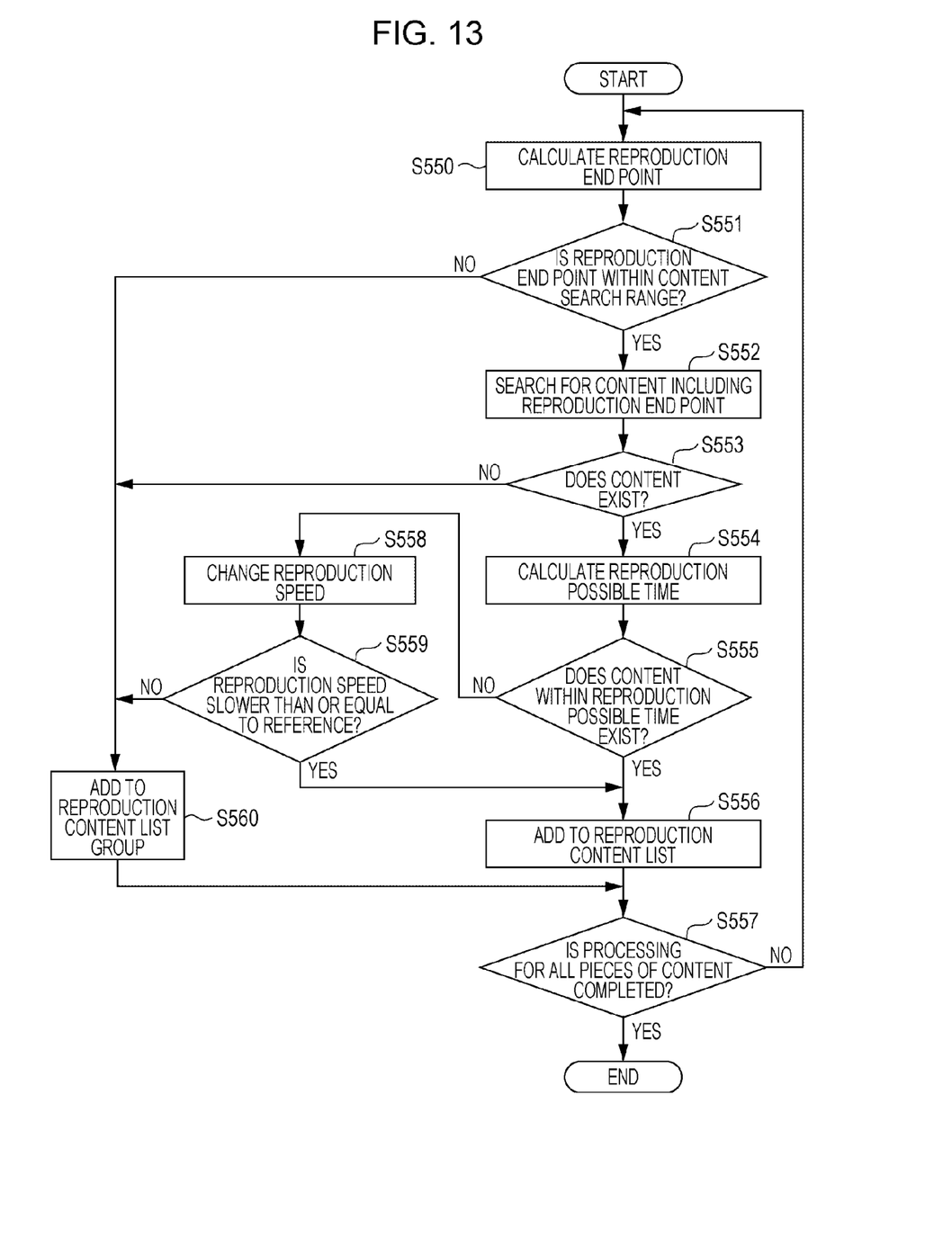
FIG. 13 is a flowchart for illustrating an example of a creation operation for a reproduction content list of the guidance device according to the second exemplary embodiment.

FIG. 13 is a flowchart for illustrating an example of a creation operation for a reproduction content list of the guidance device according to the second exemplary embodiment.

First, the content selection unit 102 receives a reproduction content list which is currently being created, and calculates a reproduction end point, which is the position of the user 2 at a point in time when reproduction of the last content is completed, on the basis of the moving speed vector of the user 2 and the reproduction time of content included in the reproduction content list (S550).

Next, when the reproduction end point is within a content search range (S551; Yes), the content information 112 is searched for content whose content providing range includes the reproduction end point (S552).

When content is found from the content information 112 (S553; Yes), the reproduction possible time of the content is calculated (S554).

When the content can be reproduced within the reproduction possible time (S555; Yes), the content is added to the reproduction content list (S556).

When the content cannot be reproduced within the reproduction possible time (S555; No), the reproduction speed is changed so that the content can be reproduced within the reproduction possible time (S558). When the reproduction speed is slower than or equal to a predetermined reference reproduction speed (S559; Yes), the operation proceeds to step S556.

Steps S550 to S556, S558, and S559 mentioned above are performed for all the pieces of content (S557).

When a determination result of step S551, S553, or S559 is "No", the reproduction content list which is currently being created is added to the reproduction content list group including plural reproduction content lists (S560).

(Advantages of Second Exemplary Embodiment)

According to the second exemplary embodiment described above, in addition to the advantages of the first exemplary embodiment, a reproduction content list group including lists of plural pieces of content is created, and therefore, plural pieces of content can be reproduced continuously.

The present invention is not limited to the foregoing exemplary embodiments, and various modifications may be made to the present invention without departing from the spirit of the present invention. For example, the guidance device 1 may be applied to an evacuation guidance system and the like, where a guidance target is used as an evacuation place, a passage point to the evacuation place, or the like.

Figure 14:
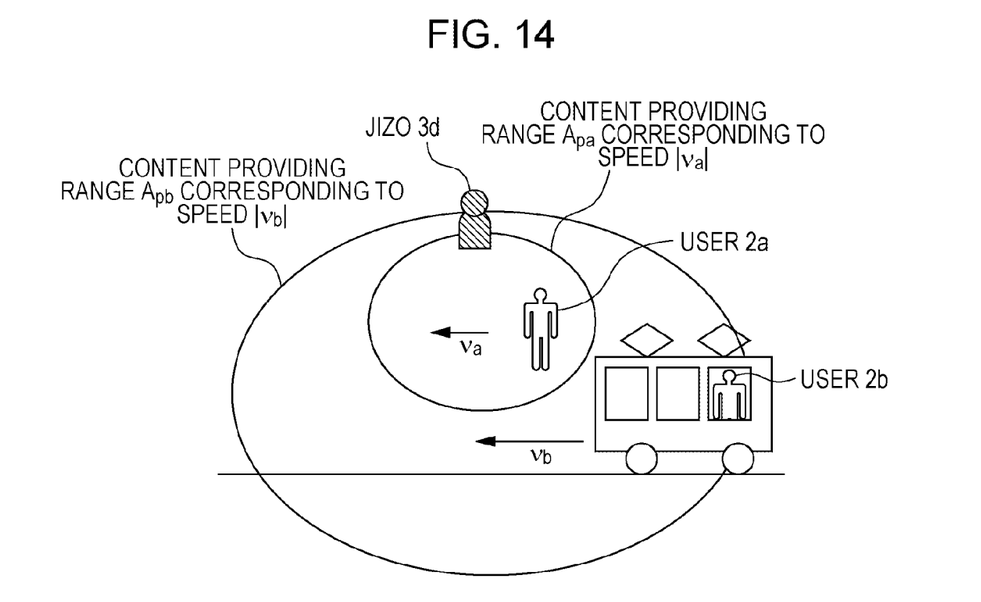
FIG. 14 is a schematic view for illustrating a modification in which a content providing range is changed in accordance with transportation means of a user.
Figure 15:
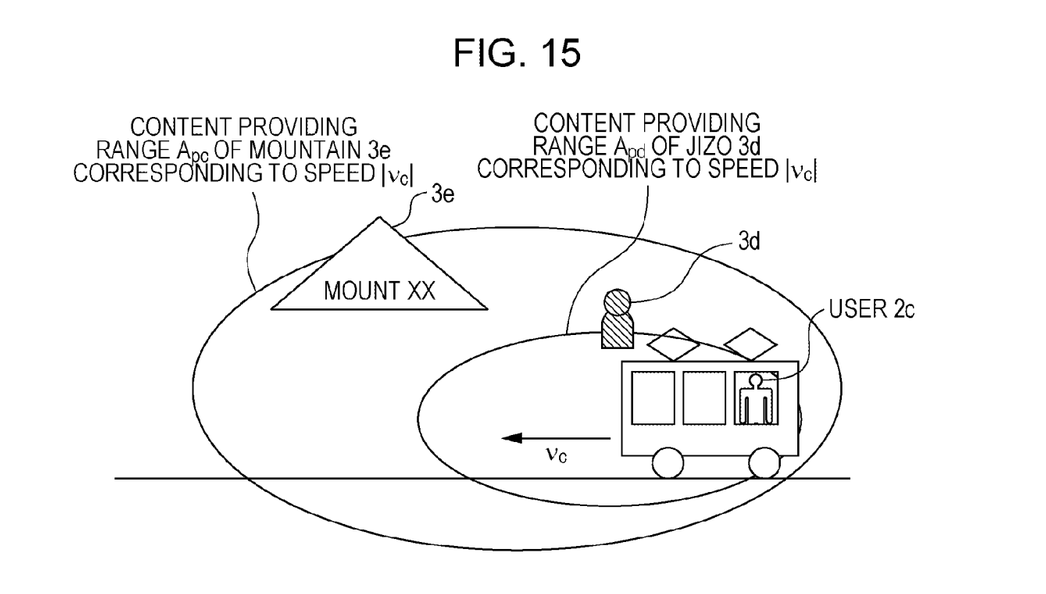
FIG. 15 is a schematic view for illustrating a modification in which priority for selecting content is changed in accordance with the moving speed of a user.
Figure 16:
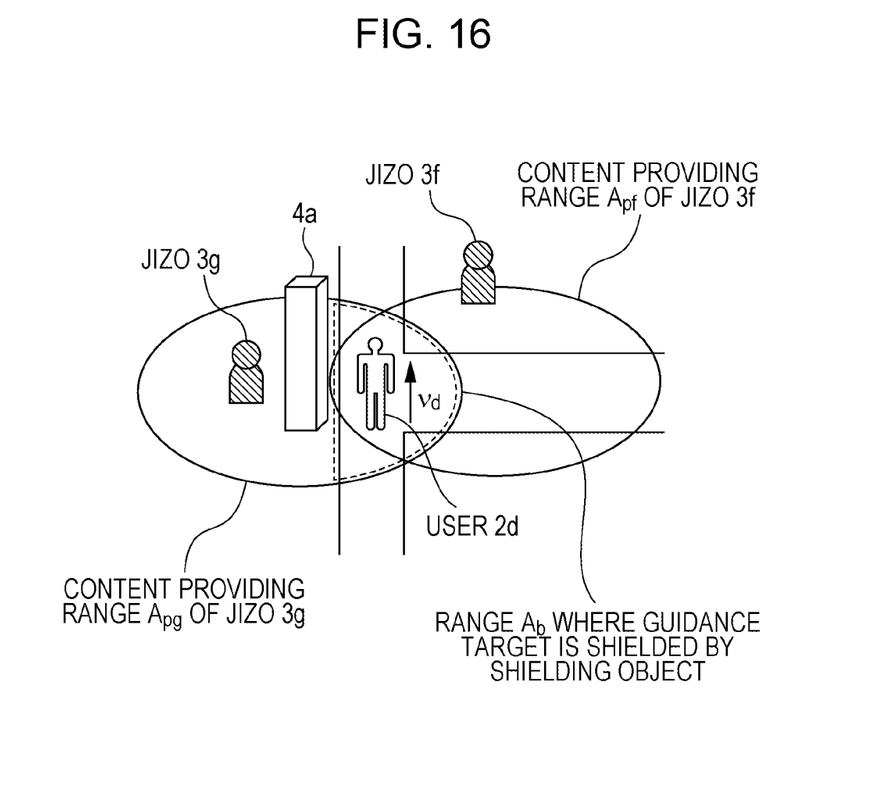
FIG. 16 is a schematic view for illustrating a modification in which a content providing range is changed in consideration of a shielding object.

Furthermore, modifications may be made as illustrated in FIGS. 14 to 16. In examples provided below, content 1 (reproduction time of 10 seconds), content 2 (reproduction time of 30 seconds), and content 3 (reproduction time of 60 seconds) for jizo (guardian deity of children), and content 4 (reproduction time of 20 seconds) and content 5 (reproduction time of 40 seconds) for Mount XX are prepared.

FIG. 14 is a schematic view for illustrating a modification in which a content providing range is changed in accordance with transportation means of a user.

A case where a user 2a who is travelling on foot as transportation means and a user 2b who is travelling by train as transportation means exist and va is smaller than vb will be explained.

The content selection unit 102 changes the content providing range on the basis of the moving speed field of the content information 112. For example, the content providing range Apa for the user 2a is set to 10 m, and the content providing range Apb for the user 2b is set to 100 m. Furthermore, the reproduction possible times for the users 2a and 2b are calculated in accordance with the content providing ranges, and content which falls within the reproduction possible times is selected. For example, when the reproduction possible time for the user 2a is calculated as 70 seconds, the content 3 whose reproduction time is 60 seconds is selected. When the reproduction possible time for the user 2b is calculated as 13 seconds, the content 1 whose reproduction time is 10 seconds is selected.

FIG. 15 is a schematic view for illustrating a modification in which the priority for selecting content in accordance with the moving speed of a user is changed.

A case where a user 2c who is travelling by train as transportation means exists and the current position of the user 2c is included in both a content providing range Apc for a large guidance target 3c, such as Mount XX, and a content providing range Apd for a small guidance target 3d, such as a jizo, will be explained.

For example, in the case where the reproduction possible time of the user 2c for the jizo 3d is calculated as 8 seconds and the reproduction possible time of the user 2c for Mount XX 3e is calculated as 30 seconds, since no content corresponding to the jizo has a reproduction time shorter than or equal to 8 seconds, none of the content 1 to content 3 are selected. Furthermore, content for Mount XX has a reproduction time of 30 seconds or shorter, and the content 2 is therefore selected.

If none of the content for Mount XX has a reproduction time shorter than or equal to 30 seconds, the reproduction speed of the content 1 for the jizo may be changed into 8 seconds and the content 1 may be selected.

FIG. 16 is a schematic view for illustrating a modification in which a content providing range is changed in consideration of a shielding object.

Even if a user 2d exists within a content providing range Apg for a jizo 3g, when a shielding object 4a exists within the content providing range Apg, a range Ab is excluded from the content providing range Apg by regarding the jizo 3g not being able to be seen in the range Ab. By preparing a field for a range based on a shielding object in the content information 112 or the like, information of the range Ab is specified.

In the foregoing exemplary embodiments, functions of the units 100 to 103 of the controller 10 are implemented by a program. However, all or part of the units may be implemented by hardware, such as ASIC. Furthermore, a program used in the foregoing embodiments may be stored in a recording medium, such as a CD-ROM, and provided. Furthermore, replacement, deletion, addition, and the like of the above steps explained in the foregoing exemplary embodiments may be made without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A guidance device comprising:
a memory configured to store information regarding content, an amount of reproduction time related to the content, and a providing range of the content;
at least one processor configured to execute:
acquiring a current position of a user and calculating a movement status of the user; and
estimating, based on the movement status, a position of the user at a time when the amount of reproduction time has passed; and
selecting from the memory content whose content providing range includes the estimated position.

2. The guidance device according to claim 1, wherein the at least one processor is further configured to execute:
reproducing the content selected by the at least one processor.

3. The guidance device according to claim 2, wherein the at least one processor is further configured to, in a case where no content whose content providing range includes the estimated position is stored in the memory, execute selecting content for which a difference between a time up to exit of the user from the content providing range of the content and the amount of reproduction time of the content is smaller than or equal to a predetermined value.

4. The guidance device according to claim 3, wherein the at least one processor is further configured to execute changing a reproduction speed of the selected content so that the position of the user at the time when the amount of reproduction time of the selected content has passed is included in the content providing range of the content.

5. The guidance device according to claim 4, wherein the at least one processor is further configured to execute reproducing the selected content at the reproduction speed which has been changed by the at least one processor.

6. The guidance device according to claim 1, wherein the memory is further configured to store information regarding a content non-providing region in which the content is not provided, and
the at least one processor is further configured to execute selecting, from the memory, content whose content non-providing region does not include the estimated position.

7. The guidance device according to claim 1, wherein the memory is further configured to store information regarding a purpose of the user and/or an attribute of the user, and
the at least one processor is further configured to, when plural pieces of content whose content providing ranges include the estimated position are selected from the memory, execute selecting a piece of content whose purpose of the user and/or attribute of the user match the information regarding the purpose of the user and/or the attribute of the user in the memory.

8. A guidance method comprising:
estimating, based on a movement status of a user calculated by acquiring positional information of the user, a position of the user at a time when an amount of reproduction time of content has passed, the content being associated with the amount of time and a providing range that are determined in advance; and
selecting content whose predetermined content providing range includes the estimated position and outputting the selected content to a reproduction destination.

9. A non-transitory computer readable medium storing a program causing a computer to execute a process for guidance, the process comprising:
estimating, based on a movement status of a user calculated by acquiring positional information of the user, a position of the user at a time when an amount of reproduction time of content has passed, the content being associated with the amount of time and a providing range that are determined in advance; and
selecting content whose predetermined content providing range includes the estimated position and outputting the selected content to a reproduction destination.

10. The guidance device according to claim 1, wherein the at least one processor is further configured to, in a case where no content whose content providing range includes the estimated position is stored in the memory, execute selecting content for which a difference between a time up to exit of the user from the content providing range of the content and the amount of reproduction time of the content is smaller than or equal to a predetermined value.

* * * * *